United States Patent [19]

Liu

[11] Patent Number: 6,148,392

[45] Date of Patent: Nov. 14, 2000

[54] LOW POWER IMPLEMENTATION OF AN ASYNCHRONOUS STOCK HAVING A CONSTANT RESPONSE TIME

[75] Inventor: Jianwei Liu, Manchester, United Kingdom

[73] Assignees: Hyundai Electronics Industries Co., Ltd., Ichon-shi, Rep. of Korea; Cogency Technology Incorporated, Ontario, Canada

[21] Appl. No.: 09/148,863

[22] Filed: Sep. 8, 1998

[51] Int. Cl.[7] ................................................ G06F 15/00
[52] U.S. Cl. .................... 712/202; 712/200; 712/201; 712/1
[58] Field of Search ................................ 712/1, 20, 32, 712/201, 236, 29, 36, 292, 200

[56] References Cited

U.S. PATENT DOCUMENTS

| | | | |
|---|---|---|---|
| 4,864,491 | 9/1989 | Ohuchi | 712/25 |
| 5,241,635 | 8/1993 | Papadopoulos et al. | 712/201 |
| 5,365,485 | 11/1994 | Ward et al. | 365/221 |
| 5,918,042 | 6/1999 | Furber | 713/600 |
| 6,038,656 | 3/2000 | Martin et al. | 712/211 |

*Primary Examiner*—John A. Follansbee
*Assistant Examiner*—Mackly Manestime
*Attorney, Agent, or Firm*—Fleshner & Kim, LLP

[57] ABSTRACT

An asynchronous stack apparatus and method is provided that reduces power consumption that maintains a constant response time regardless of the number of stored items. The asynchronous stack apparatus uses a token and control circuits to indicate a current tope of stack and process data input/output. The asynchronous stack apparatus includes a communication device, a plurality of storage units and a token control circuit.

20 Claims, 8 Drawing Sheets

LOW POWER IMPLEMENTATION OF AN ASYNCHRONOUS STOCK HAVING A CONSTANT RESPONSE TIME

BACKGROUND OF THE INVENTION

1. Field of the Invention

This invention is directed to a stack, and in particular, to a self-timed implementation of a stack.

2. Background of the Related Art

Self-timed or asynchronous methodologies use functional units having an asynchronous interface protocol to pass data and control information. By coupling such asynchronous functional units together to form larger blocks, increasingly complex functions can be realized. FIG. 1 shows two such functional units coupled via data lines and control lines. A first functional unit 100 is a sender, which passes data. The second functional unit 102 is a receiver, which receives the data.

Communication between the functional units 100, 102 is achieved by using data wires 104 and control wires. A request control wire REQ is controlled by the sender 100 and is activated when the sender 100 has placed valid data on the data wires 104. An acknowledge control wire ACK is controlled by the receiver 102 and is activated when the receiver 102 has consumed the data that was placed on the data wires 104. This asynchronous interface protocol is known as a "handshake" because the sender 100 and the receiver 102 both communicate with each other to pass the data on the data wires 104.

The asynchronous interface protocol shown in FIG. 1 can use various timing protocols for data communication. One related art protocol is based on a 4-phase control communication scheme. FIG. 2 shows a timing diagram for the 4-phase control communication scheme.

As shown in FIG. 2, the sender 100 indicates that the data on the data wires 104 is valid by setting the request control wire REQ high (active). The receiver 102 can now use the data as required. When the receiver 102 no longer requires the data, it signals back to the sender 100 the acknowledge control wire ACK high (active). The sender 100 can now remove the data from a communication bus such as the data wires 104 and prepare the next communication.

In the 4-phase protocol, the control lines must be returned to the initial state. Accordingly, the sender 100 deactivates the output request by returning the request control wire REQ low (inactive). On the deactivation of the request control wire REQ, the receiver 102 can deactivate the acknowledge control wire ACK low (inactive) to indicate to the sender 100 that the receiver 102 is ready for more data. The sender 100 and the receiver 102 follow this strict ordering of events to communicate in the 4-phase control communication scheme. Beneficially however, there is no upper bound on the delays between consecutive events.

A first-in first-out (IFO) register or pipeline provides an example of self-timed systems that couple together a number of functional units. FIG. 3 shows such a self-timed FIFO structure. The functional units can be registers 300a–300c with both an input interface protocol and an output interface protocol. When empty, each of the registers 300a–300c can receive data via an input interface 302 for storage. Once the data is stored in the registers 300a–300c, the input interface cannot accept more data. In this condition, input for the registers 300a–300c has "stalled". Each of the registers 300a–300c remains stalled until the registers 300a–300c is again empty. However, once the register 300a contains data, the register 300a can pass the data to the next stage (i.e., register) of the self-timed FIFO structure via an output interface 304. The register 300a generates an output request when the data to be output is valid. Once the data has been consumed and the data is no longer required, the register 300a is then in the empty state. Accordingly, the register 300a can again receive data using the input interface protocol.

Chaining the registers 300a–300c together by coupling the output interface 304 to the input interface 302 forms a multiple stage FIFO or pipeline. Thus, output interface request and acknowledge signals, Rout and Aout, are respectfully coupled to the following register 300a–300c (stage) input interface request and acknowledge signals, Rin and Ain. As shown in FIG. 3, data signals Din, Dout passed into a FIFO input 306 will be passed from register 300a to register 300c to eventually emerge at a FIFO output 308. Thus, data ordering is preserved as the data is sequentially passed along the FIFO. The FIFO structure shown in FIG. 3 can use the 4-phase control communication scheme shown in FIG. 2 as the input and output interface protocol.

Related art self-timed circuits can be grouped according to gate propagation delays and wiring delays. Such groupings or classifications include bounded delay, delay insensitive, and speed independent circuits.

In a bounded delay model, gate delays and wire delays are assumed finite and quantifiable. The bounded delay model can be used in synchronous systems. Data from the sender in the bounded delay model can be transferred to the receiver after an appropriate delay.

In a delay-insensitive model, gate delays and wire delays are assumed to be unbounded. Data from the sender must be consumed and acknowledged by the receiver before new data can be transferred.

In a speed-independent delay model, gate delays are assumed to be unbounded but wire delays are assumed to be negligible. Control circuits using the speed-independent delay model can be less complex because data sent by the sender to a plurality of receivers need only be acknowledged by a single receiver of the plurality of receivers.

A stack operates as a last in first out (LIFO) device. For example, a stack can be used as a memory device. The last value input to the stack in a write operation is the first value to be output during the next read operation. In a VLSI system, for example, stacks are used in various ways such as in evaluating expressions, managing return addresses for subroutine calls, storage of local variables for subroutines, and passing parameters for subroutine calls.

Examples of related art stacks include a register based stack, a latch based stack and a RAM based stack. In the register based stack, data values are stored in a shift register. Placing data in the stack is called a "push" and requires new data to be shifted into the shift register in one direction. Removing the data from the stack is called a "pop" and shifts the data in the opposite direction out of the shift register. Each "push" and "pop" operation requires every data value stored in the shift register to move one location. Thus, register based stacks can operate as a two-way shift register. Shift registers have a simple control structure. However, since every data value moves with each push or pop operation, a control signal must be broadcast to all storage elements in the register. Accordingly, complex D type latches are used. Further, power inefficiencies occur as data propagates the entire length of the shift register for each of the push or pop operations.

In the latch based stack, data values are stored in a simple latch rather than complex D type latches. Unlike the register based stack design, communication between adjacent latches is local in the latch based stack. Each latch communicates with adjacent neighbors to transfer new data into the stack (push) or read the data from the stack (pop). Latch based stacks can operate as a two way ripple register. The latch based stack has advantages when the stack is not full or empty. In other words, pushing the data onto an empty stack results in the transfer of data using only a single latch. Thus, an advantage of the latch based stack is a reduction in the number of data transfers between latches when the stack is not full. However, disadvantages of the latch based stack include a variable response time based on how many data items are in the stack during a given operation. The number of data transfers between adjacent latches increases as the latch based stack fills. Preferably, a response time is constant for push or pop operations regardless of the amount of data in the stack.

In the RAM based stack, the address space of the RAM is considered to be linear. Thus, a stack can be implemented by adding a pointer to indicate the correct address for the next write (push) or read (pop) operation. For example, an address pointer can be incremented or decremented for each push or pop instruction, respectively. Thus, the RAM based stack can be used as an array implementing a pointer. The RAM based stack is efficient for large stacks. Further, in the RAM based stack, management of the full and empty conditions is complex.

Synchronous implementations for stacks trade off performance for power consumption or ease of implementation. In addition, the time required to perform a push or pop operation is depends on the number of data values stored in the stack. A need exists for a stack that exhibits low power and a constant response time.

SUMMARY OF THE INVENTION

An object of the present invention is to substantially obviate the one or more problems caused by disadvantages of the prior art.

Another object of the present invention is to provide a speed independent asynchronous stack.

Another object of the present invention is to reduce power consumption of a stack.

Another object of the present invention is to provide an asynchronous stack that uses a token to identify a top of stack condition.

Another object of the present invention is to provide an asynchronous stack having a constant prescribed response time for push or pop operations.

Another object of the present invention is to provide an asynchronous stack that monitors a load status of the stack.

In order to achieve at least the above objects in a whole or in part, there is provided an asynchronous stack according to the present invention that includes a communication device, a plurality of data storage units coupled to the communication device and a token control circuit.

To further achieve the above objects in a whole or in parts, there is provided a method for operating an asynchronous stack having a plurality of intercoupled storage units according to the present invention that includes receiving a first signal, selecting one of a plurality of token control units that contains a token, and processing data for a corresponding one of the storage units based on a second signal from the selected token control unit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENTS

Figure 1:
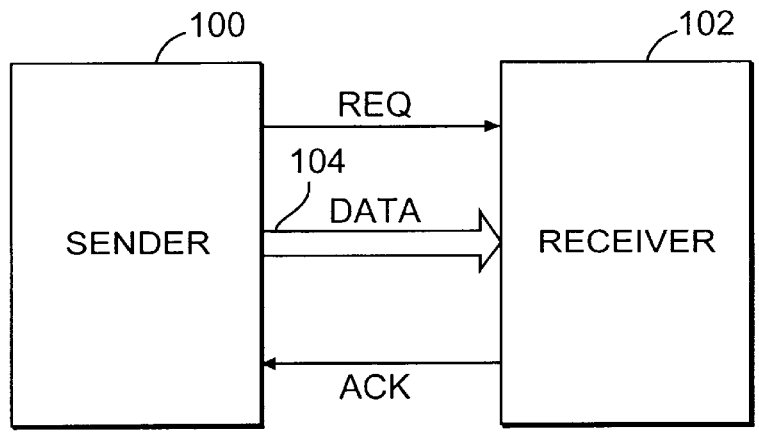
FIG. 1 is a block diagram showing a self-timed data interface.
Figure 2:
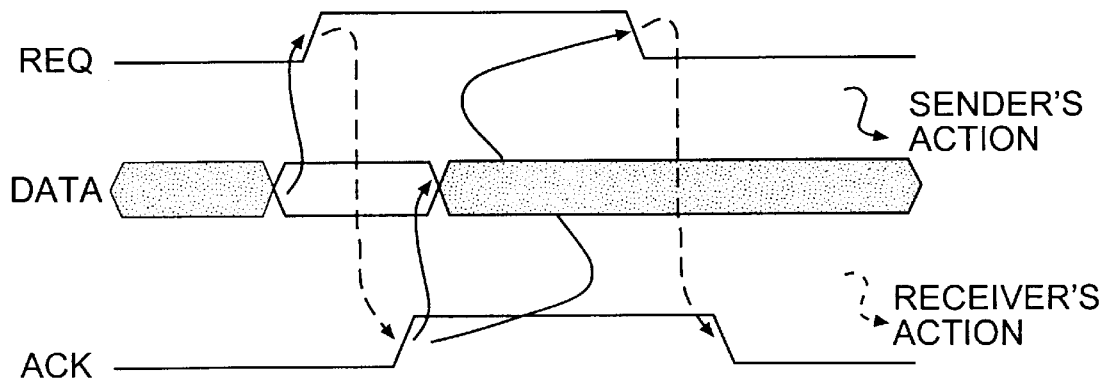
FIG. 2 is a diagram showing signal waveforms of a four-phase communication protocol.
Figure 3:
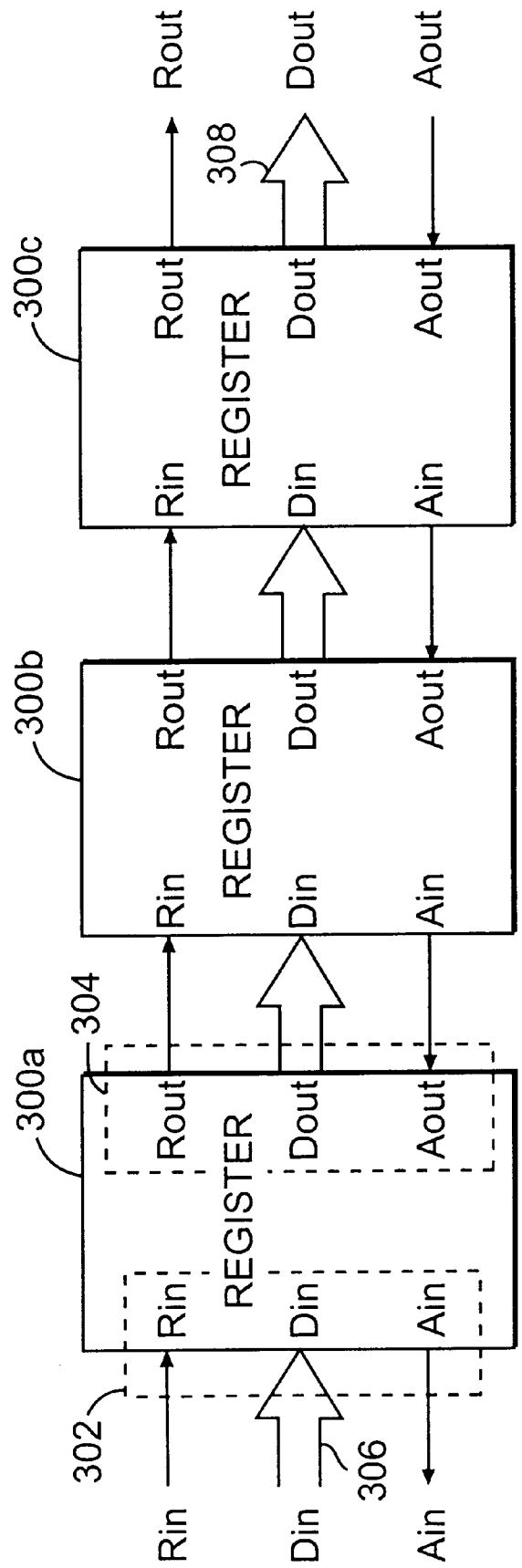
FIG. 3 is a block diagram showing a self-timed first-in-first-out (IFO) data interface.
Figure 4:
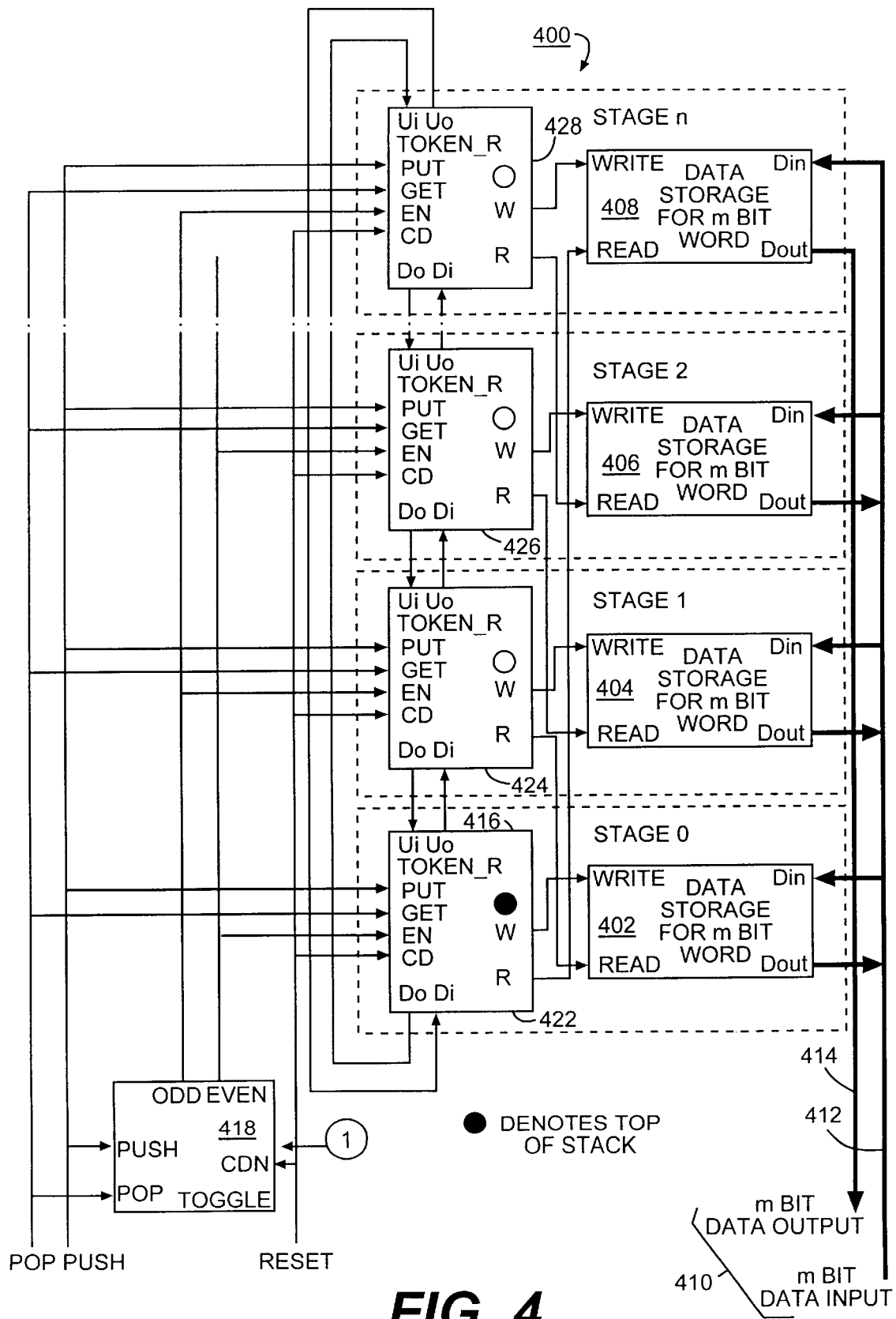
FIG. 4 is a block diagram showing a preferred embodiment of a self-timed stack according to the present invention.

FIG. 4 shows preferred embodiment of a self-timed stack 400 according to the present invention. FIG. 4 is a block diagram showing a self-timed stack 400 that includes latches 402–408 to store data words and control circuits 422–428 for each of the data words. If a first in first out (FIFO) stack is "n" words deep and "m" bits wide, the stack 400 contains "n" sets of storage elements. Each set of storage elements includes "m" level sensitive latches.

The stack 400 preferably implements operations for a set of signals. As shown in FIG. 4, a push signal controls a push input operation that writes a data value into the stack 400 using a data bus 410. The pop operation reads a data value that is output from the stack 400 using the data bus 410. The data bus 410 preferably includes a data input bus 412 for inputting data to the stack 400 and a data output bus 414 for outputting data from the stack 400.

In the stack 400, a token 416 is used to identify a current top of the stack 400. The push operation requires a write to a top of the stack 400 and the pop operation requires a read from the top of the stack 400. Movement of the token 416 between adjacent or neighboring control circuits is accomplished via the handshake signals UP IN/UP OUT Ui/Uo and DOWN IN/DOWN OUT Di/Do. As shown in FIG. 4, each of the control circuits 422–428 corresponds to one of the latches 402–408.

For push operations where the token 416 is passed up the stack 400, the UP OUT signal Uo initiates the transfer (request) and the DOWN OUT signal Do acknowledges completion of the transfer of the token 416.

Pop operations result in the transfer of the token 416 down the stack 400. In this case, the token 416 transfer is requested by the DOWN OUT signal Do and acknowledged by the UP OUT signal Uo.

The stack 400 further includes a toggle circuit 418 that enables operation between odd and even words within the stack 400 and a reset signal that controls a reset operation to reset the stack 400. Consecutive operations of the stack 400, either push or pop, alternate between even and odd rows. As described above, the stack 400 has "n" rows. Each of the control circuits 222–228 are labeled TOKEN_S or TOKEN_R. The TOKEN_S control circuit contains the token 416 after the reset operation while the TOKEN_R circuits do not. The token 416 is passed up a network of control circuits during write operations and down the network of control circuits during read operations via handshake signals between each control or token circuit.

Figure 5A:
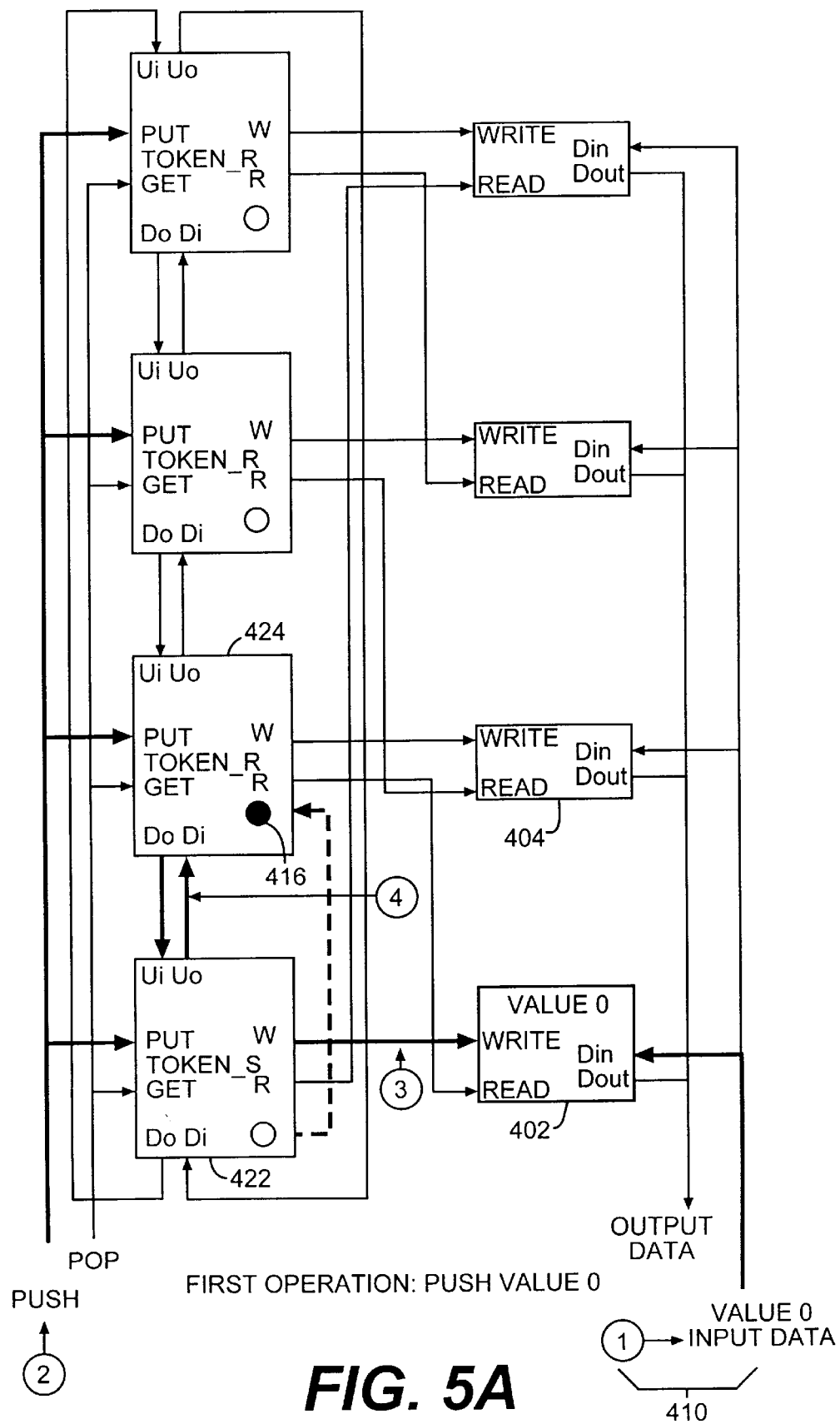
FIGS. 5A–5C are diagrams showing operations the self-timed stack of FIG. 4.
Figure 5B:
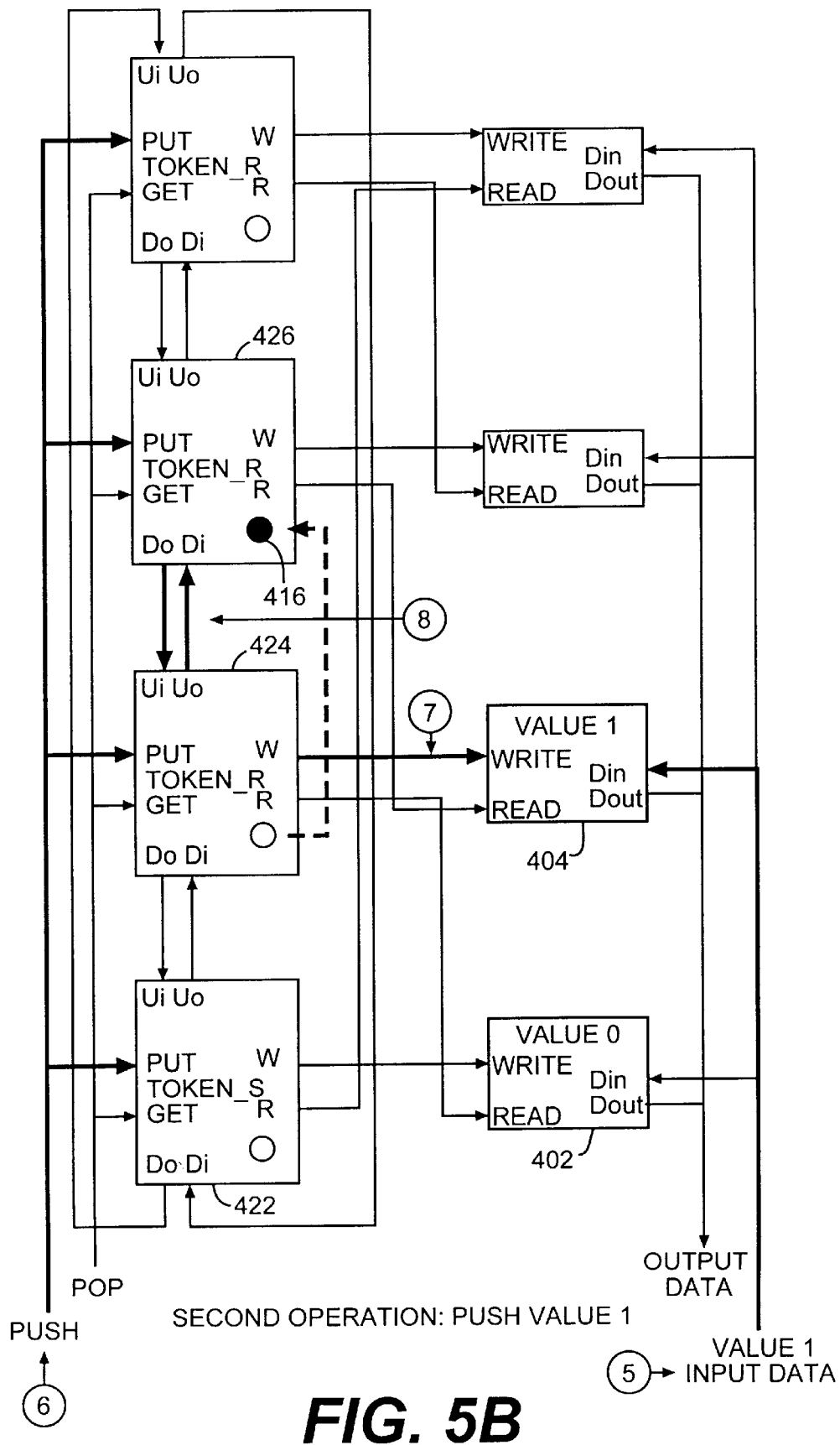
Figure 5C:
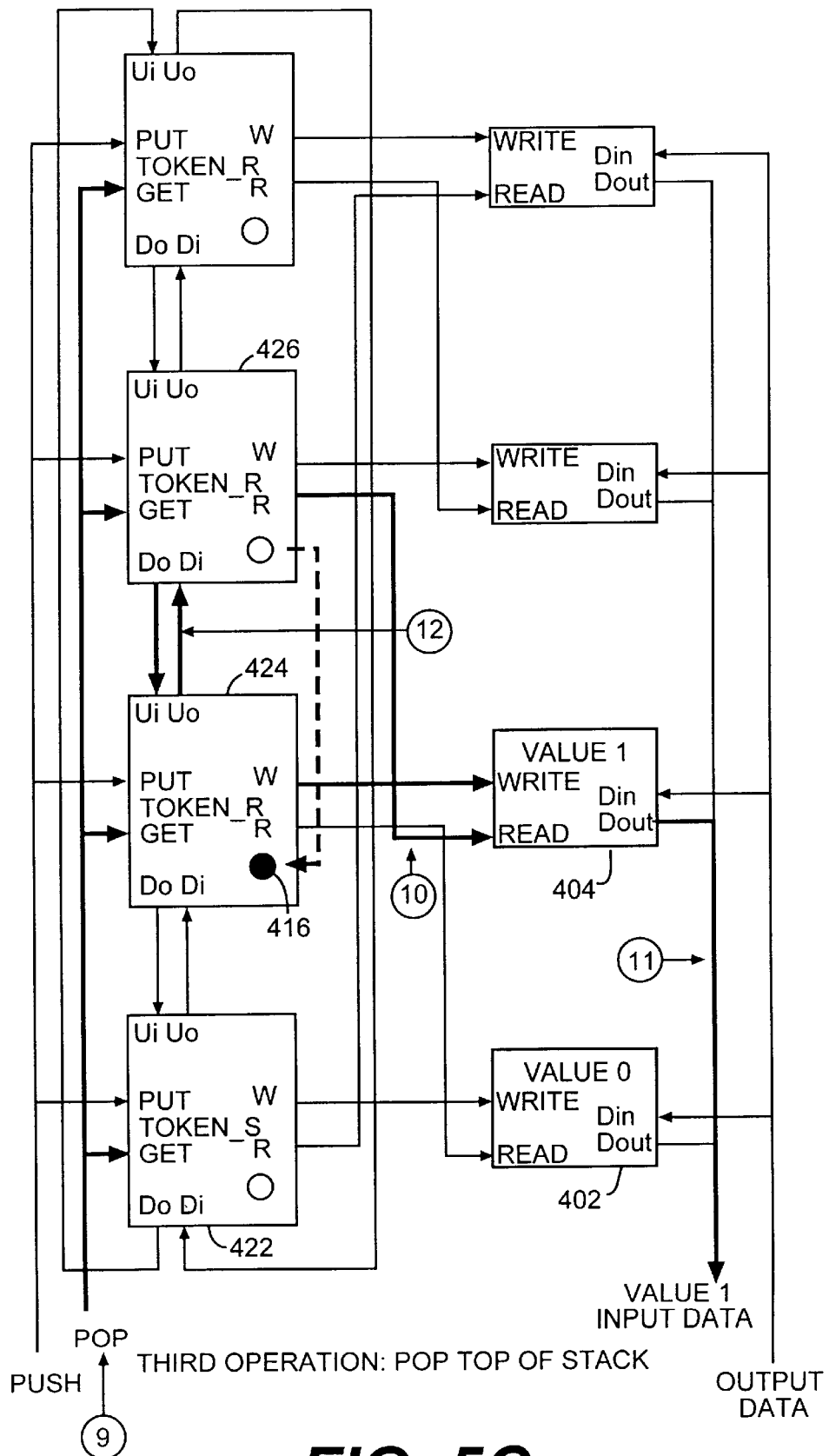

Exemplary stack operations of the stack 400 will now be described. Operations of the stack 400 for two push operations followed by a pop operation are shown in FIGS. 5A–5C. A first push operation begins when a data value "0" is placed on the data input bus 412 as indicated by the reference number (1). Then, a push control signal is applied to the stack 400 as indicated by reference number (2). The control circuit 422 generates a write signal for the latch 402 and the input data value "0" is stored in the latch 402 as indicated by reference number (3). Transfer of the token 416 to a new top of stack position at control circuit 424 is performed using the handshake signals Uo/Ui and Do/Di as indicated by reference number (4).

As shown in FIG. 5B, a second push operation is performed in a manner identical to the first push operation. The input data value "1" is placed on the input data bus 412 as indicated by reference number (5). Then, the push signal is applied to the stack 400 as indicated by reference number (6). The control circuit 424 generates the write signal for the latch 404 required to store the data value "1" as indicated by reference number (7). Again, the handshake signals Uo/Ui and Do/Di request and acknowledge, respectively, the transfer of the token 416 up the stack 400 as indicated by reference number (8).

Pop operations remove data from a stack and transfer a token down the stack 400 and change the new top of stack position. As shown in FIG. 5C, the operational sequence for a pop operation is initiated by the controller (not shown) asserting a pop signal to the stack 400 as indicated by reference number (9). The top of stack token control logic preferably generates the read signal for the latch 404 as indicated by reference number (10) and the top of stack data is available via the output data bus 404 as indicated by reference number (11). The down out signal Do from the control circuit 426 requests the token 416 transfer down the stack 400 to the control circuit 424. The token transfer is complete when acknowledged by the signal Uo as indicated by reference number (12). As shown in FIGS. 5A–5C, the preferred embodiment of a self-timed stack has a constant response time when executing pop or push operations, and the push and pop operations are independent of how many data items are stored in the stack 400.

Figure 6:
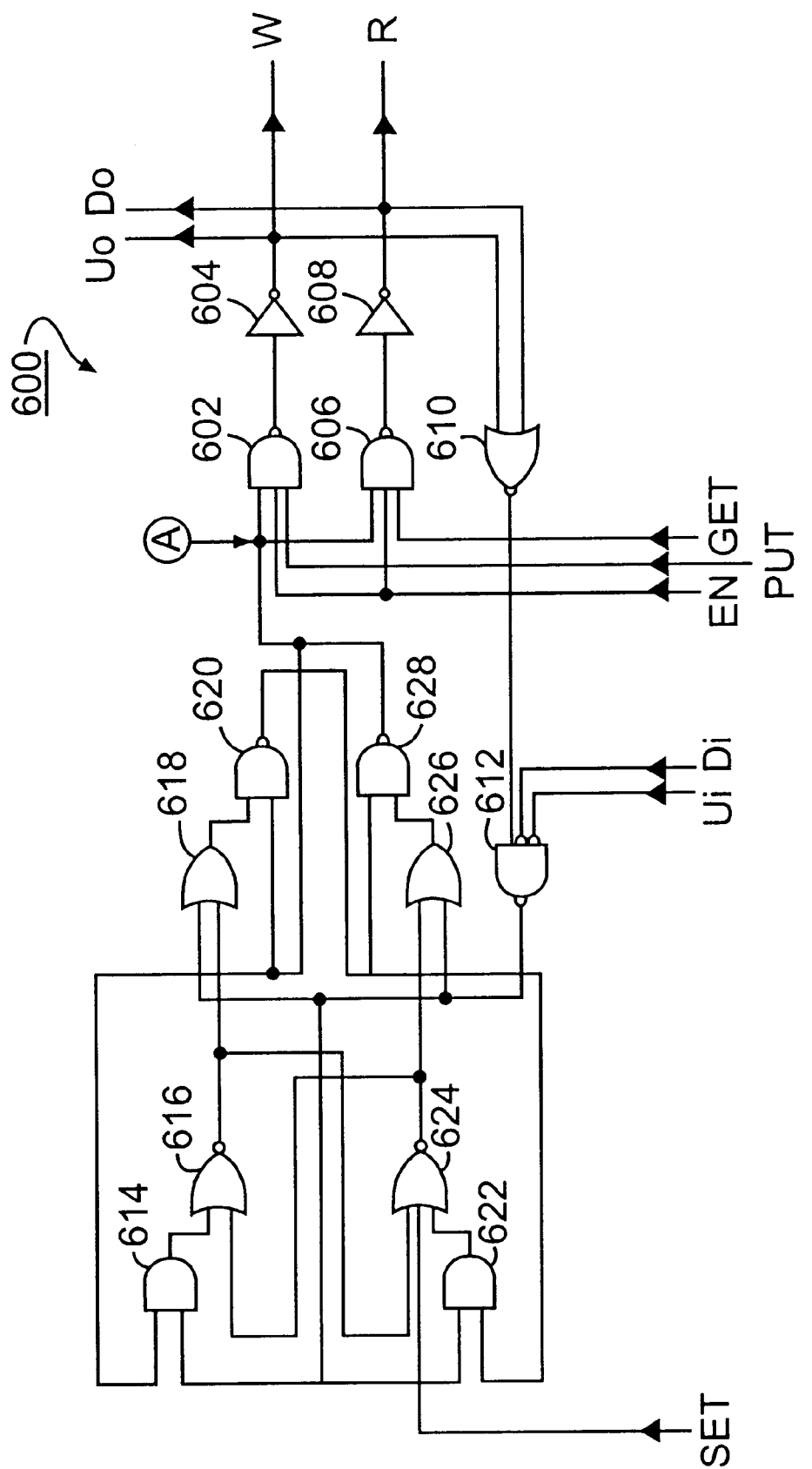
FIG. 6 is a circuit diagram showing a preferred embodiment of a control circuit for a self-timed stack according to the present invention.

A preferred embodiment of a token control logic circuit is shown in FIG. 6. The preferred embodiment can be used with a self-timed digital signal processor or the like. Node A is the output of a set/reset flip flop defined by U(1, ... n). In the circuit of FIG. 4, the set/reset flip flop would be defined by U1 to U4. The value of the node A is high when the control logic contains a token and low if a token is not present.

As shown in FIG. 6, the token control logic circuit 600 includes a NAND gate 602 that receives a signal from the node A, a PUT signal and an ENABLE signal to output the WRITE signal via an inverter 604, and a NAND gate 606 that receives the signal from the node A, a GET signal and the ENABLE signal to output the READ signal via an inverter 608. The READ and WRITE signals are received by a corresponding data storage unit such as the latch 402. The token control logic circuit 600 further includes NOR gate 610 that receives the READ and WRITE signals, and a NAND gate 612 receives the Ui signal, the Di signal and an output signal of the NOR gate 610. An AND gate 614 receives an output signal of the NAND gate 612 and the signal from the node A. A NOR gate 616 receives output signals from the AND gate 614 and a NOR gate 624. An OR gate 618 receives the output signals of the NAND gate 612 and the NOR gate 616 and an NAND gate 620 receives the signal from the node A and an output signal of the OR gate 618. An output signal of the NAND gate 620 is fed back to an AND gate 622 along with the output signal of the NAND gate 612. A NOR gate receives a SET signal and outputs signal of the NAND gate 622 and the NOR gate 616. An output signal of the NOR gate 624 is combined with the output signal of the NAND gate 612 by an OR gate 626 whose output is combined with the output of the NAND gate 620 to output the node A signal. As shown in FIG. 6, the token control logic circuit is for control circuit that would contain the token after the reset operation.

Figure 7A:
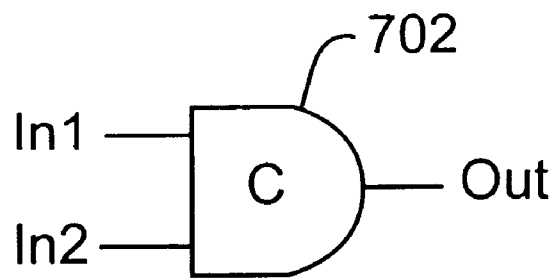
FIGS. 7A–7B are diagrams showing exemplary C-gates.
Figure 7B:
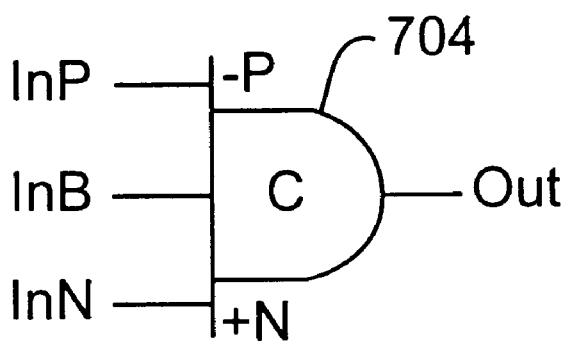

One self-timed circuit element used in self-timed functional units is the Muller C-gate. The Muller C-gate can perform an AND function for self-timed events. FIGS. 7A and 7B respectively show a standard C-gate element 702 and an asymmetric C-gate element 704.

The 2-input standard Muller C-gate 702 as shown in FIG. 7A performs the following function:

IF (In1 AND In2) THEN Out→High;

ELSE IF (/In1 AND /In2) THEN Out→Low; and

ELSE no change on Out.

Therefore, if both the inputs In1 and In2 are high, the C-gate 702 generates a high level output. If both the inputs In1 and In2 are low, the C-gate 702 generates a low level output. When the inputs In1 and In2 have different values (e.g., low/high or high/low, respectively), the C-gate 702 remains in a previously set condition.

The asymmetric Muller C-gate 704 shown in FIG. 7B performs the following function:

IF (InB AND InN) THEN Out→High;

ELSE IF (/InB AND /InP) THEN Out→Low; and

ELSE no change on Out.

Therefore, if the inputs InB and InN are high, the C-gate 704 generates a high level output irrespective of the value of the input InP. If the inputs InB and InP are low, the C-gate 704 generates a low level output irrespective of the input InN. Thus, the inputs InN and InP only effect the setting of the C-gate 704 output high and low, respectively. All other input values for the inputs InN, InP and InB leave the C-gate 704 output in a previously set condition.

As shown in FIG. 6, the four phase control protocol is used to implement the handshake signals Ui, Di, Uo, Do, Put and Get. However, the present invention is not intended to be limited to this. Alternative interface or handshake protocols can be used. Further, the preferred embodiment of a self-timed stack preferably uses less complex control structures. Performance benefits accrue from the low complexity. For example there is only one AND gate delay from the Put/Get signals and the Write/Read signals in the preferred embodiment of the token control logic circuit as shown in FIG. 6. Moreover, various implementations for the token control logic can be used.

Further, the preferred embodiments of the self-timed latch use a standard level sensitive latch for a storage device. However, the present invention is not intended to be limited to this. Alternative means of data storage can be used such as alternative latches and devices.

The preferred embodiment of the stack and the token control logic communicate locally with storage registers and neighbor control circuits. Accordingly, power consumption is lower than related art synchronous designs because local control eliminates long interconnections (e.g., wires) between system elements. Further, push or pop operations do not require data to propagate up or down the stack because of the local communication. Propagation of data unnecessarily charges and discharges wire capacitance, which increase power consumption. In addition, the preferred embodiments of the token control logic circuit is speed independent. Thus, variations in wire delays between the token control circuits will not alter the functionality of the circuits.

In addition, the status of the self-timed stack can be monitored. For example, the preferred embodiment of the token control logic circuit can be used to monitor the status of the stack. In other words, whether the self-timed stack is full, empty or any state between full and empty is detected by monitoring the location of the token within the stack. The monitoring function can be incorporated, for example, in the token control logic circuit.

As described above, the preferred embodiments of a self-timed stack and token control logic circuit according to the present invention have various advantages. The preferred embodiments of the self-timed stack use a less complex circuit while maintaining or improving processing speed. Further the preferred embodiments have reduced or low power requirements and are speed independent. In addition, the preferred embodiment of a self-timed stack have a constant response time and use a token to indicate a current top of stack.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. An asynchronous stack, comprising:
   a communication device;
   a plurality of data storage units coupled to the communication device; and
   a token control circuit, wherein the token control circuit comprises,
      a plurality of token control units, wherein each of the token control units correspond to one of the data storage units, and
      a local control circuit coupling the plurality of token control units to determine capacity of the asynchronous stack, and wherein the token control circuit controls a data access operation for the asynchronous stack in response to a received instruction.

2. The asynchronous stack of claim 1, wherein the stack has a prescribed response time for one of a first operation to store data to a selected data storage unit and a second operation to retrieve the data from the selected data storage unit, wherein the prescribed response time is constant regardless of an amount of data stored in the stack.

3. The asynchronous stack of claim 2, wherein the local control circuit modifies the capacity of the stack in response to the data access operation.

4. The asynchronous stack of claim 3, wherein the token control circuit has a plurality of logic control circuits, wherein each of the logic control circuits comprises:

a first logic circuit that receives a stack capacity signal, a first data access operation signal, a second data access operation signal and an enable signal and outputs a read signal, a write signal and first and second handshake transfer signals, wherein the read and write signals are received by a corresponding data storage unit; and a second logic circuit that receives the first and second handshake transfer signals, first and second handshake receive signals and a reset data access operation signal to output the stack capacity signal.

5. The asynchronous stack of claim 4, wherein the first logic circuit comprises:

a first logic gate that receives the stack capacity signal, the first data access operation signal being push and the enable signal;

a second logic gate that receives an output signal of the first logic gate and outputs the write signal;

a third logic gate that receives the stack capacity signal, the second data access operation signal being pop and the enable signal; and a fourth logic gate that receives an output signal of the third logic gate and outputs the read signal, and wherein the second logic circuit comprises,
   a fifth logic gate that receives the first and second handshake transfer signals,
   a sixth logic gate that receives the first and second handshake receive signals and an output signal of the fifth logic gate,
   a seventh logic gate that receives the stack capacity signal and an output signal of the sixth logic gate,
   an eighth logic gate that receives an output signal of the seventh logic gate,
   a ninth logic gate that receives the output signal of the sixth logic gate and an output signal of the eighth logic gate,
   a tenth logic gate that receives the stack capacity signal and an output signal of the ninth logic gate,
   an eleventh logic gate that receives the output signal of the sixth logic gate and an output signal of the tenth logic gate,
   a twelfth logic gate that receives the output signal of the eighth logic gate, the reset data access operation signal and an output signal of the eleventh logic gate to generate an input signal for the eighth logic gate,
   a thirteenth logic gate that receives the output signal of the sixth logic gate and an output signal of the twelfth logic gate, and
   a fourteenth logic gate that receives an output signal of the thirteenth logic gate and the output signal of the tenth logic gate to output the stack capacity signal.

6. The asynchronous stack of claim 1, wherein the plurality of token control units uses a single token to monitor the asynchronous stack status.

7. The asynchronous stack of claim 6, wherein the plurality of token control units pass the token based on an amount of data received by the stack.

8. The asynchronous stack of claim 7, wherein the token returns to a prescribed one of the plurality of token control units upon receipt of a reset signal by the token control circuit.

9. The asynchronous stack of claim 7, wherein a selected one of the plurality of token control units contains the token based upon the amount of data stored by the stack.

10. The asynchronous stack of claim 9, wherein the selected token control unit controls the corresponding one of the data storage units to output a stored data to the communication device and pass the token to an adjacent downstream token control circuit upon receipt of a pop signal.

11. The asynchronous stack of claim 9, wherein the selected token control circuit controls the corresponding one of the data storage units to store an input data received using the communication device and pass the token to an adjacent upstream token control circuit upon receipt of a push signal.

12. The asynchronous stack of claim 1, wherein the token control circuit receives at least one of a push and a pop input control signals, wherein the data storage units are latches, and wherein the stack is M bits wide and N words deep.

13. The asynchronous stack of claim 1, further comprising a toggle unit that outputs at least an odd control signal and an even control signal to the token control circuit.

14. The asynchronous stack of claim 1, wherein the token control circuit uses a four phase communication protocol, and wherein the communications device includes an input data bus and an output data bus.

15. The asynchronous stack of claim 1, wherein the stack has reduced power requirements.

16. The asynchronous stack of claim 1, wherein the token control circuit determines the stack capacity based on a token position, and wherein the local control circuit modifies the capacity of the stack in response to the data access operation.

17. A method of operating an asynchronous stack having a plurality of intercoupled storage units, the method comprising:

receiving a first control signal;

selecting one of a plurality of token control units that contains a token and generating a second signal responsive to the first control signal;

processing data for a corresponding one of the storage units based on the second signal from the selected token control unit, wherein the processing data step comprises, performing one of storing data and retrieving data to the corresponding storage unit, and locally modifying a capacity of the asynchronous stack in response to the performing step, wherein the processing data step has a constant response time independent of an amount of data stored in the stack.

18. The method of claim 17, further comprising monitoring a load status of the stack based on a location of the token.

19. The method of claim 17, further comprising passing the token to an adjacent token control unit based on the first control signal.

20. The method of claim 17, where in the first control signal is at least one of reset, push and pop, wherein the second signal is at least one of read data and write data, and wherein the token is stored in a prescribed one of the plurality of storage units when the input control signal is the reset signal.

* * * * *

UNITED STATES PATENT AND TRADEMARK OFFICE
CERTIFICATE OF CORRECTION

PATENT NO. : 6,148,392
DATED : November 14, 2000
INVENTOR(S) : Jianwei Liu

It is certified that error appears in the above-identified patent and that said Letters Patent is hereby corrected as shown below:

On title page, and column 1,
[54] Change "Stock" to --Stack--.

Signed and Sealed this

Fifth Day of June, 2001

Attest:

Attesting Officer

NICHOLAS P. GODICI
Acting Director of the United States Patent and Trademark Office